United States Patent

[11] 3,629,067

| [72] | Inventors | Paul Demaison;<br>Pierre Menissier, both of Grenoble; Jean Sionnet, Saint-Egreve, all of France |
|---|---|---|
| [21] | Appl. No. | 774,317 |
| [22] | Filed | Nov. 8, 1968 |
| [45] | Patented | Dec. 21, 1971 |
| [73] | Assignee | Societe Industrielle De Combustible Nucleaire<br>Paris, France |
| [32] | Priority | May 6, 1968 |
| [33] | | France |
| [31] | | 150751 |

[54] SPACER GRID FOR NUCLEAR REACTOR FUEL ASSEMBLY
10 Claims, 5 Drawing Figs.

[52] U.S. Cl. .................................................. 176/78, 176/81
[51] Int. Cl. ..................................................... G21c 3/34
[50] Field of Search ............................................ 176/76, 78, 81

[56] References Cited
UNITED STATES PATENTS

| 3,137,638 | 6/1964 | Kumpf et al. ................. | 176/78 |
| 3,350,275 | 10/0967 | Venier et al. ................. | 176/78 |
| 3,369,973 | 2/1968 | Voigt et al. ................... | 176/78 |
| 3,378,452 | 4/1968 | Costes .......................... | 176/78 |
| 3,380,890 | 4/1968 | Glandin et al. ............... | 176/78 |
| 3,442,763 | 5/1969 | Chetter et al. ................ | 176/78 |

*Primary Examiner*—Carl D. Quarforth
*Assistant Examiner*—Gary G. Solyst
*Attorney*—Cameron, Kerkam & Sutton ABSTRACT: In a nuclear reactor fuel assembly comprising a bundle of rods of fissile or fertile material placed within a casing and supported by two rigid end grids, the rods are maintained at different points between the two end support grids by a spacer grid constituted in accordance with the invention by a frame which surrounds the rods inside the casing and supports at least one layer of parallel helical springs, the turns of said springs being tangent to the rods. Preferably, the layers of springs are four in number, the successive layers being disposed alternately in two directions at right angles to each other whilst the helices of layers having the same direction are relatively displaced by one-half pitch.

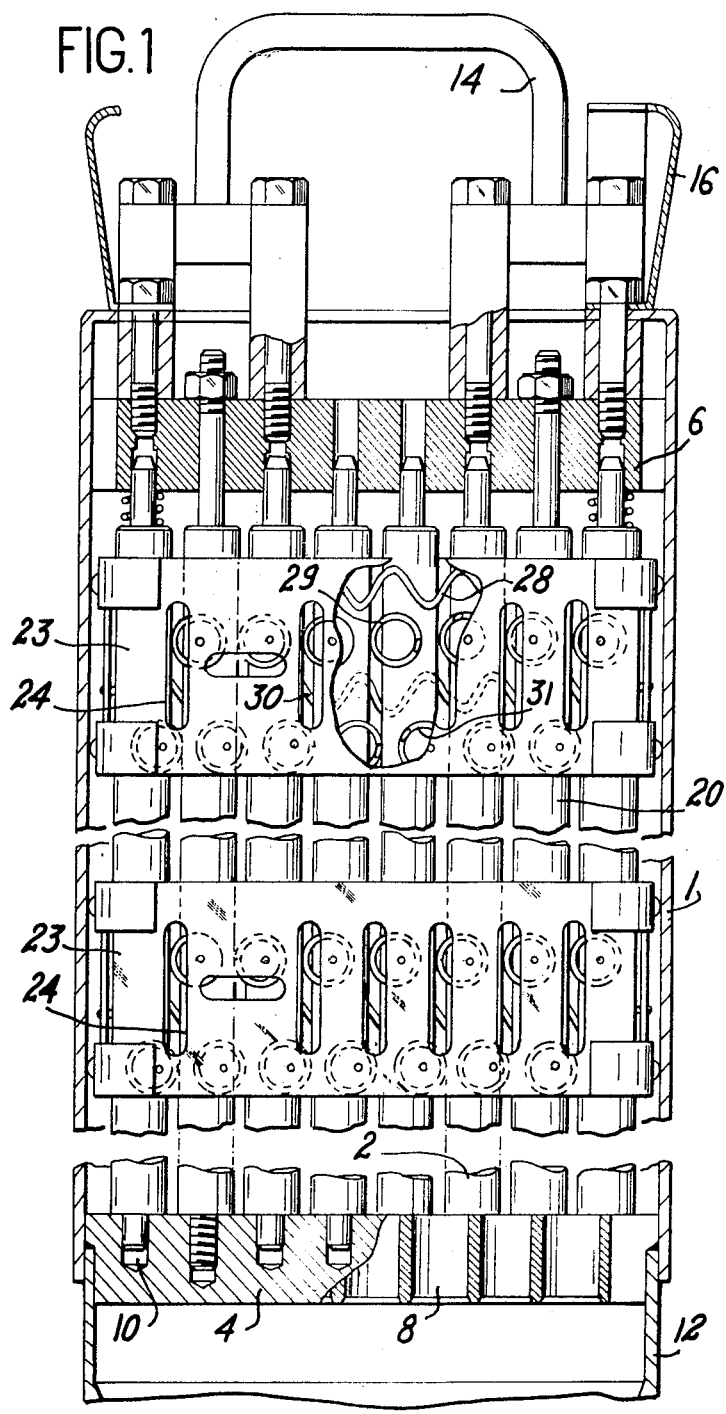

SPACER GRID FOR NUCLEAR REACTOR FUEL ASSEMBLY

The present invention is concerned with a spacer grid for a nuclear reactor fuel assembly, especially an assembly comprising a bundle of rods of fissile or fertile material placed within a casing and supported by two rigid end grids so as to ensure uniform spacing between said rods, braces or spacer grids being also mounted at uniform intervals between the end support grids in order to prevent deformation of the fuel rods.

A number of designs of grids or braces have been employed up to the present time but are usually subject to a major disadvantage in that they provide an insufficient number of points of contact with the fuel rods. As a consequence, vibrations and deformations of said rods are not wholly absorbed, thereby causing a local reduction in the cross-sectional area afforded for the flow of coolant between the fuel rods. This in turn gives rise to overheating which is incompatible with the good behavior of the fuel assembly and can even result in destruction of the fuel rods by melting.

Grids of the above-mentioned type also offer high resistance to coolant flow and the resultant pressure drops are detrimental to high performance of the fuel assembly.

The aim of the present invention is to propose a remedy for the disadvantages referred to above by providing a flexible spacer grid which affords on the one hand minimum resistance to coolant flow and which, on the other hand, provides a large number of uniformly spaced points of contact with the fuel rods both around the periphery and along the length of said rods, thereby permitting of effective absorption of the vibrations induced by the circulation of coolant and of the deformations caused during irradiation. The service life of the fuel assembly can thus be considerably extended.

This invention is in fact directed to a spacer grid comprising a frame which is adapted to surround the fuel rods and to support at least one layer of parallel helical springs, the turns of which are tangent to said fuel rods.

In accordance with another property of the invention, the frame comprises four perforated plates joined together by means of rounded corner brackets, the parallel helical springs being fixed in two opposite plates.

In a preferred form of construction, the frame surrounds a plurality of superposed layers of helical springs which are tangent to the fuel rods, the springs of the successive layers being disposed alternately in two directions at right angles and the helices of layers having the same direction being relatively displaced by one half pitch.

The pitch of the helices is preferably equal to the distance between the axes of the fuel rods or to a multiple of said distance. Said pitch as well as the arrangement of the turns relative to said fuel rods can vary according to the shape and characteristics of the fuel assembly. The number and distribution of the points of contact can thus be varied according to the deformations to be absorbed.

However, each fuel rods is always maintained by means of a plurality of points of contact which are uniformly distributed both along the length of said fuel rod and about its periphery, thereby ensuring strict accuracy of spacing. In addition, the small pressure force which is exerted on the fuel rods by the springs makes it possible to absorb the vibrations and the deformations which arise within the fuel assembly.

Furthermore, the filiform design of the springs affords extremely low resistance to the flow of coolant and consequently ensures satisfactory removal of heat.

A number of other properties and advantages of the invention will in any case become apparent from the following description of one form of construction which is given by way of nonlimitative example, reference being made to the accompanying drawings, in which:

FIG. 1 is a part-sectional side view showing the interior of the casing of a nuclear reactor fuel assembly;

Figure 3:
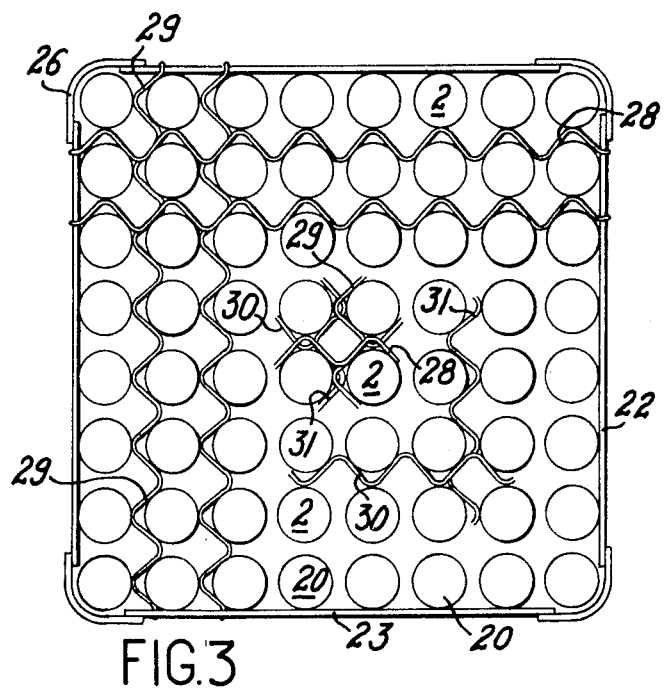
FIG. 3 is a diagrammatic top view showing a fuel rod spacer grid.

In many types of nuclear reactor and especially liquid-cooled reactors, each fuel assembly usually comprises within a casing 1 (as shown in FIG. 1) a bundle of fuel rods 2 containing fuel material which may be either fissile or fertile material, said rods being assembled in two end grids 4 and 6. A duct for the circulation of cooling fluid is formed around the fuel rods 2 by the casing 1 which is provided at one end beyond the grid 4 with a frustoconical extension 12 through which said cooling fluid is intended to penetrate.

Figure 2:
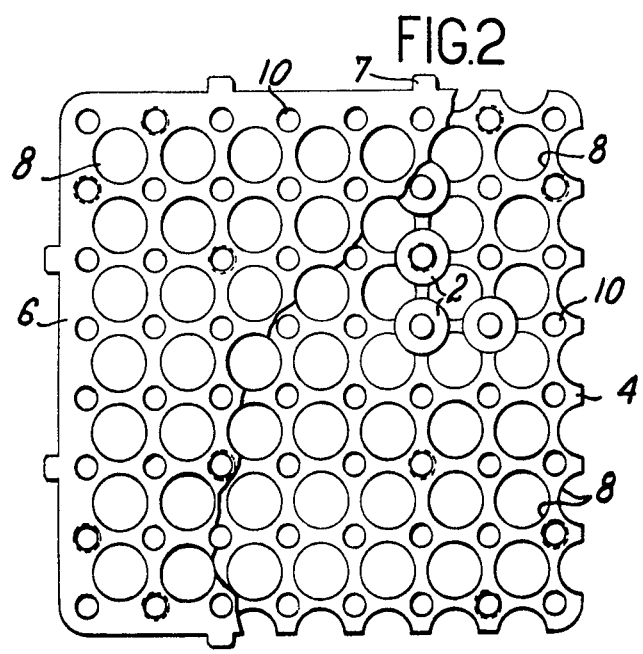
FIG. 2 is a fragmentary top view showing the rigid grids for supporting the fuel rod extremities.

Each end support grid 4 and 6 is also pierced by a number of holes 8 which permit the flow of coolant therethrough and between and which are formed recesses 10 for accommodating fuel rods 2. As can be seen from FIG. 2, the holes 8 are of sufficiently large diameter to provide a communication with a plurality of fuel rods 2 and thus to permit the coolant to circulate between said rods.

The frustoconical end fitting 12 which is welded to the end support grid 4 serves to secure the fuel assembly to a stationary core support structure or reactor diagrid (not shown) in which are pierced orifices for admission of the coolant.

At the other end of the fuel assembly, the support grid 6 is provided with bosses 7 against which the casing 1 is applied and is adapted to support a number of members such as a handle 14 for manipulating the fuel assembly and a spring 16 for centering this latter within the reactor core.

Within the casing 1, braces or spacer grids 18 are mounted at uniform intervals on the fuel rods 2 and serve both to maintain these latter in equidistant relation and to absorb the vibrations and deformations which might otherwise occur. Said spacer grids are maintained in position by means of spacer grid support rods 20.

In accordance with the invention, each spacer grid is provided inside the casing 1 (FIG. 3) with a frame which is similar in cross section to that of said casing 1 and which, in the exemplified construction shown in the drawings, is therefore a square frame formed by four plates 22, 23. Said plates are provided with axial or transverse elongated slots 24 (FIG. 4) so as to permit free flow of the cooling fluid and are joined together by rounded corner brackets 26.

The two opposite plates 22 or 23 are adapted to support at least one layer of parallel helical springs 28, 29 which are tangent to the fuel rods 2. The two layers are thus formed in directions at right angles to each other. Said layers are also relatively displaced along the fuel rod 2 in order that the springs should be well separated from each other.

Figure 4:
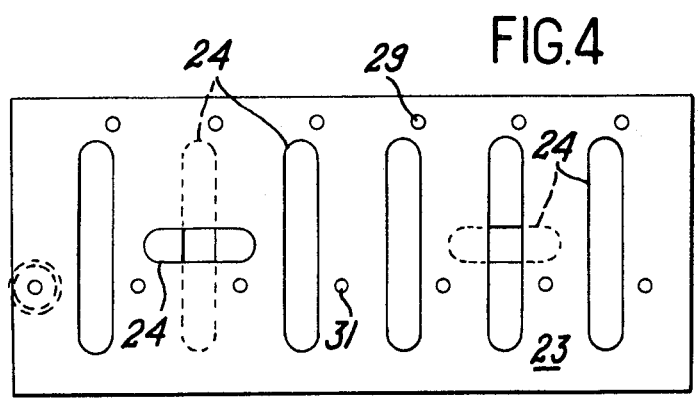
FIG. 4 is a side view of the aforesaid spacer grid.

In accordance with the form of construction illustrated in FIG. 3, the helix of each spring 28, 29 has a pitch equal to the distance between the axes of two adjacent fuel rods 2 and is placed in such a manner as to be tangent at the summits thereof to one row of fuel rods and at two points thereof to the adjacent row, Each fuel rod 2 is thus in contact with each layer of springs at three points.

There is preferably welded to each group of plates 22, 23 a second layer of springs 30, 31, the helices of which are parallel to those of the first layer 28, 29, but relatively displaced by one-half pitch. Said second layer 30, 31 is therefore in contact with each fuel rod at three points which are diametrically opposite to those of the first layer but displaced along the length of the fuel rod 2.

The layers of parallel helices 28 and 30 are thus arranged alternately with two other layers of helices 29, 31 located in perpendicular directions whilst they are themselves displaced relative to each other about the fuel rods 2.

Each fuel rod 2 is therefore in contact with the springs by means of four series of tangential points which are uniformly distributed over its periphery.

In spite of their number, the springs are of the filiform or wire type and therefore take up an extremely small space between the fuel rods, thus permitting the coolant to flow freely between them. Furthermore, said springs are endowed with a high degree of flexibility and exert a small force on the fuel rods which are accordingly permitted to absorb the vibrations induced by the circulation of the coolant and also provide effective resistance to deformations caused by irradiation.

The fuel rods are thus firmly maintained at strictly equal distances whilst the coolant is permitted to circulate freely.

The number and distribution of spacer grids along he length of the fuel assemblies can readily be chosen so as to endow the fuel assembly with a long service life.

It will be understood that the pitch of the helices and the arrangement of these latter between the fuel rods could be modified according to the design conditions and characteristics of the fuel assembly.

Figure 5:
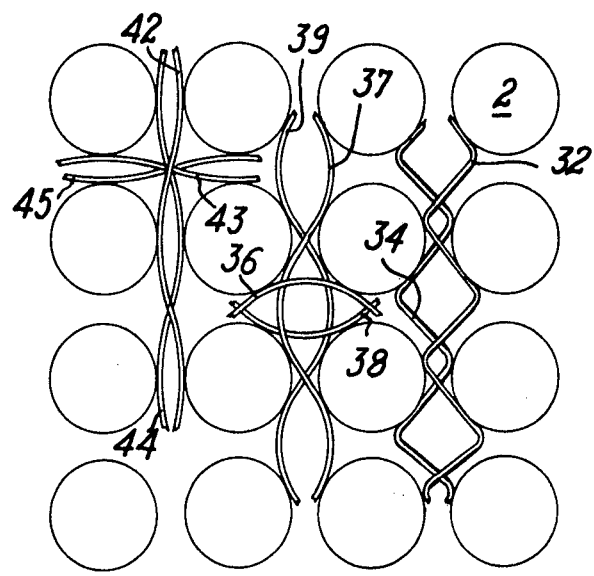
FIG. 5 shows a number of alternative arrangements of helical springs between the fuel rods.

A number of different forms of construction are shown diagrammatically and by way of example in FIG. 5.

Helices 32, 34 having a pitch equal to the distance between the axes of the fuel rods can in fact be disposed between these latter in such a manner that each helix has only a single point of contact with each fuel rod. Each fuel rod is in that case maintained by means of two points of contact in each layer. The alternate arrangement of layers formed by said helices with layers which are disposed at right angles and the relative displacement by one half pitch of the helices which are located in the same direction nevertheless provide eight points of contact on each rod, thus providing effective support.

Consideration could also be given to the use of helices having a pitch which is double the distance between the axes of the fuel rods.

In that case and depending on their arrangement, the helices each have a single point of contact such as 36 with each fuel rod or a point of contact such as 42 with one fuel rod out of two.

As in the case of FIG. 3, said helices are arranged in four layers 36, 37, 38, 39 or 42, 43, 44, 45 which are disposed alternately in two directions at right angles and displaced by one-half pitch so as to provide a large number of points and directions of support. In the least favorable case, the helices 42, 43, 44, 45 support each fuel rod at four points which are distributed over the periphery and length of this latter at the location of each spacer grid; in some cases, this can prove sufficient to absorb vibrations and deformations in an effective manner by reason of the fact that coolant pressure drops are minimized in a construction of this type.

It is wholly apparent that other arrangements could be adopted without thereby departing from the scope of the invention. Thus, the rations between the pitch of the fuel rods and the pitch of the helices can be varied according to requirements as well as the arrangement of the springs in relation to the fuel rods and the number of layers of each grid.

What we claim is:

1. A spacer grid for a nuclear reactor fuel assembly of a bundle of rods of fissile or fertile material within a casing and supported by two rigid spaced end grids, comprising a frame in the casing surrounding the rods and a plurality of helical springs having their ends supported by said frame and arranged parallel in at least one layer, the axes of the helices of said springs being perpendicular to the fuel rods and the turns of the helices being tangent to the fuel rods.

2. A spacer grid in accordance with claim 1, said springs being disposed in a plurality of spaced superposed layers, the springs of one layer being secured to the same opposite sides of said frame, the springs of the next layer being secured to the other opposite sides of said frame, and the springs of layers secured to the same sides of said frame being displaced by a distance equal to one-half of the pitch of the helix of the springs.

3. A spacer grid in accordance with claim 1, said frame having lateral openings for the flow of a cooling fluid.

4. A spaced grid in accordance with claim 1, said frame comprising four perforated plates and rounded corner brackets connecting said plates, said parallel helical springs being secured in opposite ones of said plates.

5. A spacer grid in accordance with claim 1, having four layers of springs, two of said layers being disposed in each perpendicular direction.

6. A spacer grid in accordance with claim 5, the helix of each spring having a pitch equal to the distance between the axes of the fuel rods.

7. A spacer grid in accordance with claim 5, the helix of each spring having a pitch equal to the distance between the axes of adjacent rods.

8. A spacer grid in accordance with claim 5 each spring being tangent at one point to each fuel rod and the grid being tangent at eight points to each fuel rod.

9. A spacer grid in accordance with claim 5 each layer of springs being tangent at three points to each fuel rod and the grid being tangent at 12 points to each fuel rod.

10. A fuel assembly comprising a casing, a bundle of rods of fuel material in said casing, two spaced end grids in said casing supporting said rods, spacer grids within said casing each comprising a perforated frame, a plurality of spaced layers of helical springs supported in said frame perpendicular to said fuel rods and disposed at right angles to each other, the helices of the layers disposed in the same direction being displaced by one-half pitch of the helix and support rods for maintaining said spacer grids in position in said casing.

* * * * *